United States Patent [19]

Liebermann et al.

[11] Patent Number: 5,177,153
[45] Date of Patent: Jan. 5, 1993

[54] SUSPENSION POLYMERIZATION PROCESS FOR THE PREPARATION OF POLYMERIC MATERIAL FROM GASEOUS AND NON-GASEOUS MONOMERS

[75] Inventors: George Liebermann, Mississauga; William J. Dale, Scarborough; Nam S. Ro, Mississauga; Daniel M. McNeil, Georgetown; Stephan Drappel, Toronto, all of Canada

[73] Assignee: Xerox Corporation, Stamford, Conn.

[21] Appl. No.: 896,778

[22] Filed: Jun. 10, 1992

[51] Int. Cl.⁵ .................. C08F 2/18; C08F 212/08
[52] U.S. Cl. .................. 525/314; 525/313; 526/71; 526/80; 526/73; 526/87; 526/340
[58] Field of Search ............. 526/71, 87, 88, 340, 526/340.1, 80; 525/243, 314, 313

[56] References Cited

U.S. PATENT DOCUMENTS

| | | | |
|---|---|---|---|
| 3,683,511 | 8/1972 | Johnson et al. | 34/9 |
| 3,732,335 | 5/1973 | Hermans et al. | 260/878 |
| 3,738,972 | 6/1973 | Moriyama et al. | 260/85.5 |
| 3,793,244 | 2/1974 | Megee | 260/29.7 |
| 3,980,603 | 9/1976 | Bradley et al. | 260/29.6 |
| 4,052,483 | 10/1977 | Feeney et al. | 260/880 |
| 4,082,714 | 4/1978 | LoScalzo et al. | 260/29.7 |
| 4,123,405 | 10/1978 | Oyamada et al. | 260/29.6 |
| 4,371,677 | 2/1983 | Morningstar et al. | 526/80 |
| 4,485,223 | 11/1984 | Walinsky | 526/80 |
| 4,558,108 | 12/1985 | Alexandru et al. | 526/340 |
| 4,972,032 | 11/1990 | Henton et al. | 526/80 |
| 5,045,611 | 9/1991 | McNeil | 526/81 |
| 5,071,918 | 12/1991 | Funato et al. | 526/80 X |
| 5,089,295 | 2/1992 | McNeil | 427/128 |

*Primary Examiner*—Fred Teskin
*Attorney, Agent, or Firm*—Zosan S. Soong

[57] ABSTRACT

A suspension polymerization process for the preparation of a polymeric material formed from at least two monomers, a non-gaseous monomer and a gaseous monomer. The composition of the beads or particles of the polymeric material is controlled by adding gaseous monomer to the vapor phase after polymerization of about 5% to about 90% by weight of the non-gaseous monomer or by removing a portion or substantially all of the gaseous monomer in the vapor phase before polymerization of about 70% by weight of the gaseous monomer in the aqueous suspension, or a combination thereof.

25 Claims, No Drawings

SUSPENSION POLYMERIZATION PROCESS FOR THE PREPARATION OF POLYMERIC MATERIAL FROM GASEOUS AND NON-GASEOUS MONOMERS

This invention relates generally to processes for the preparation of polymers, and specifically to suspension polymerization processes for the preparation of polymers useful as toner resins. More specifically, there are provided in accordance with the present invention suspension polymerization processes in which at least one of the monomers is a gas, the controlled addition or removal of which permits the preparation of polymeric materials with specific compositions and characteristics.

The development of electrostatic latent images with toner particles is well known. Toner particles typically include colorants and other additives dispersed in a polymeric resin. There continues to be a need for new processes which provide resins with a range of characteristics useful for toner applications.

Various processes for preparing polymeric materials, useful as toner resins, by suspension polymerization, using at least two monomers out of which one is a gas, are disclosed:

Alexandru et al., U.S. Pat. No. 4,558,108, pertains to an aqueous suspension polymerization process for the preparation of a styrene/butadiene copolymer. The disclosure of this document is totally incorporated by reference. This document discloses that residual butadiene monomer may be reduced in the final reaction product by removing substantially all the butadiene monomer still present in the vapor phase after at least about 75 percent by weight of the butadiene monomer and styrene monomer in the aqueous phase are converted to a copolymer and prior to more than about 98 percent by weight of the butadiene monomer and styrene monomer in the aqueous phase are converted to a copolymer.

McNeil, U.S. Pat. No. 5,089,295, pertains to the preparation of polymers which comprises a suspension free radical polymerization of a monomer phase comprised of at least two monomers and a polymerization initiator; and an aqueous phase comprised of water and magnetite. A low level of residual butadiene in the copolymer is obtained by removing the butadiene monomer from the vapor phase in a fashion similar to U.S. Pat. No. 4,558,108.

McNeil, U.S. Pat. No. 5,045,611, pertains to the preparation of polymers which comprises a suspension free radical polymerization of a monomer phase comprised of at least two monomers which include butadiene.

Dale et al., U.S. Ser. No. 07/612,668, filed Nov. 14, 1990 (D/90195), pertains to a process for obtaining copolymers with low residual butadiene using an inert gas purge. The disclosure of this document is totally incorporated by reference.

The above processes involve procedures to obtain very low residual levels of the gaseous monomer in the finished copolymer.

Other polymerization processes involving a gaseous or volatile monomer in which said monomer is added or removed, for various reasons, during the polymerization process are also disclosed:

Johnson et al., U.S. Pat. No. 3,683,511, pertains to a method of removing volatiles from an elastomer.

Moriyama et al., U.S. Pat. No. 3,738,972, pertains to a suspension polymerization process for the production of styrene/acrylonitrile copolymers. An inert gas is passed through the polymerization system after the conversion has reached 75% to 85% to remove excess acrylonitrile, whereby there is obtained a styrene/acrylonitrile copolymer having a uniform homogeneous composition throughout the polymerization process.

Megee et al., U.S. Pat. No. 3,793,244, pertains to water-retaining latexes of styrene/butadiene/itaconic acid terpolymers.

Hermans et al., U.S. Pat. No. 3,732,335, pertains to a process for the preparation of block copolymers.

Bradley et al., U.S. Pat. No. 3,980,603, pertains to the microsuspension polymerization of vinyl halide monomer, wherein additional monomer is added during the polymerization.

Feeney et al., U.S. Pat. No. 4,052,483, pertains to the preparation of a copolymer of butadiene, styrene, and acrylonitrile by emulsion polymerization.

Lo Scalzo et al., U.S. Pat. No. 4,082,714, pertains to a process for the emulsion polymerization of conjugated dienes.

Oyamada et al., U.S. Pat. No. 4,123,405, pertains to a process for preparing aqueous emulsions of vinyl chloride/vinyl acetate/ethylene terpolymers.

Morningstar et al., U.S. Pat. No. 4,371,677, pertains to a process for making dispersion copolymers through monomer metering.

Henton et al., U.S. Pat. No. 4,972,032, pertains to a process for preparing copolymers of alpha-methylstyrene and acrylonitrile.

Walinsky, U.S. Pat. No. 4,485,223, pertains to the preparation of (meth)acrylic acid/itaconic acid copolymers.

SUMMARY OF THE INVENTION

It is an object of the present invention to prepare polymeric materials by free radical suspension polymerization.

An additional object is to provide resins with a range of characteristics useful for toner applications.

Another object is to provide a procedure for preparing polymeric composites containing homopolymer-copolymer mixtures, copolymer mixtures and pseudo-block copolymers by suspension polymerization using two or more monomers, wherein at least one of the monomers is a gas.

A further object is to provide a procedure for preparing by suspension polymerization a bimodal and/or partially crosslinked copolymer, preferably a styrene/butadiene copolymer, without using an additional polyfunctional monomer (such as divinylbenzene and the like, which may function as a crosslinker), and which copolymer can be useful for low melt toner compositions.

These objects and others are met by a suspension polymerization process for the preparation of a polymeric material formed from at least two monomers, a first monomer and a gaseous second monomer, comprising:

(a) providing a vapor phase and an aqueous suspension comprised of an aqueous phase and an organic phase comprising the first monomer, wherein the gaseous monomer is partitioned among the vapor phase, the organic phase, and the aqueous phase, and wherein the gaseous monomer in the vapor phase and the aqueous suspension at the outset of polymerization is in an amount of from 0% to 100% by weight of the total weight of the gaseous monomer employed in the polymerization process;

(b) controlling the amount of the gaseous monomer in the aqueous suspension and the vapor phase during the polymerization process by:

(i) adding gaseous monomer to the vapor phase after polymerization of about 5% to about 90% by weight of the first monomer, whereby during the remainder of the polymerization process the gaseous monomer solubilizes in the aqueous suspension and diffuses to the organic phase where it copolymerizes with the first monomer; or (ii) removing in an effective amount, sufficient to render the resulting polymeric material nonhomogeneous, at least a portion of the gaseous monomer in the vapor phase before polymerization of about 70% by weight of the gaseous monomer in the aqueous suspension and continuing the polymerization process; or (iii) a combination of steps (i) and (ii); and (c) heating the aqueous suspension to a temperature between about 50° C. and about 130° C.

As used herein, the term "nonhomogeneous" refers to the nature of the resulting beads or particles of polymeric material as having the following characteristics: (i) a composite of homopolymers and random copolymers; (ii) a composite of random copolymers of differing gaseous monomer content; (iii) a composite of random copolymers of bimodal and/or crosslinked components; or (iv) a composite of (i), (ii), or (iii) containing a component having in each copolymer chain block segments of differing gaseous monomer content.

DETAILED DESCRIPTION

Any suitable gaseous monomer may be employed in the process of the present invention. The term gaseous refers to any monomer which is a gas at the polymerization temperature/pressure employed. Representative gaseous monomers include butadiene, isoprene, vinyl halides (e.g., vinyl bromide, vinyl chloride), acrylonitrile, isobutylene, ethylene, and propylene. A preferred gaseous monomer is butadiene. It is understood that more than one gaseous monomer may be employed in the present invention. Thus, the gaseous component may be a mixture of several gaseous monomers to be employed as described herein. The mixture of gaseous monomers may be in any effective ratio of monomers, e.g., in the case of two gaseous monomers, preferably 80% by weight of the first gaseous monomer to 20% by weight of the second gaseous monomer. In the polymeric material of the present invention, the gaseous monomer may be present in an amount from about 1 to about 99 percent by weight, and preferably, 5 to about 30 percent by weight.

Any suitable non-gaseous monomer (i.e., liquid or solid monomer) typically used to prepare toner resins may be employed in the present invention. Illustrative examples of the monomers that may be copolymerized with the gaseous monomer include vinyl monomers, such as styrene, α-methylstyrene, p-chlorostyrene and the like; monocarboxylic acids and their derivatives such as acrylic acid, methyl acrylate, ethyl acrylate, butyl acrylate, dodecyl acrylate, octyl acrylate, octadecyl acrylate, phenyl acrylate, methacrylic acids, methyl methacrylate, ethyl methacrylate, butyl methacrylate, octyl methacrylate, octadecyl methacrylate and acrylamide; dicarboxylic acids with a double bond and their derivatives such as maleic acid, monobutyl maleate, dibutyl maleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated mono-olefins; vinylidene halides such as vinylidene chloride and the like; N-vinyl compounds such as N-vinyl pyrrole and the like; and mixtures thereof. It is understood that more than one liquid or solid monomer may be copolymerized with the gaseous monomer. The mixture of non-gaseous monomers may be in any effective ratio of monomers, e.g., in the case of two non-gaseous monomers, preferably 80% by weight of the first non-gaseous monomer to 20% by weight of the second non-gaseous monomer. In the polymeric material of the present invention, the liquid or solid monomer may be present in an amount from about 1 to about 99 percent by weight, preferably, 70 to about 95 percent by weight.

In one embodiment, styrene and butadiene are selected as monomers to enable, for example, a styrene/butadiene copolymer with from about 75 to about 95 percent by weight of styrene. The preferred ratio of the styrene monomer to butadiene monomer reactant is between about 80 to 20 and about 95 to 5 by weight. Excessively low ratios of styrene monomer may cause a decrease of the glass transition temperature (Tg) to under 50° C. which may lead to unacceptably low toner resin blocking temperatures and agglomeration of toner particles obtained from such resins. Unduly high ratios of styrene monomer may result in copolymers with high softening temperatures and result in toners requiring high fixing temperatures and high fixing energy.

Generally, examples of toner polymers obtained with the process of the present invention include styrene/acrylonitrile and styrene/butadiene copolymers, preferably with, for example, about 80 percent to about 92 percent by weight of styrene and from about 20 to about 8 percent by weight of butadiene or acrylonitrile. One most preferred product obtained is a styrene/butadiene copolymer in the ratio of 82/18 and 90/10 by weight.

Any suitable amount of a free radical polymerization initiator insoluble in water, soluble in the liquid or solid monomer may be employed in the process of this invention. Typical monomer soluble free radical polymerization initiators include n-lauryl peroxide, benzoyl peroxide, acetyl peroxide, decanoyl peroxide, azo-bis-isobutyronitrile t-butyl butylperbenzoate, O,O-t-butyl-O-(ethylhexyl)monoperoxycarbonate, peroxydicarbonates 2,2-azo-bis(2,4-dimethyl-1-4-methoxyvaleronitrile), 2,2-azo-bis(2,4-dimethylvaleronitrile), and mixtures thereof. Optimum results may be achieved with peroxides, peroxycarbonates peroxybenzoates, azonitrile free radical polymerization initiators, and the like. These free radical polymerization initiators should possess a half life of about 1 hour at temperatures between about 50° C. and about 130° C. in order to effect adequate polymerization at reaction temperatures between about 50° C. and about 130° C. for reaction times of less than about 8 hours. A mixture of two or more free radical polymerization initiators with different half lives can be used in conjunction with two or more polymerization temperatures for a particular process. Satisfactory results may be achieved when the reaction mixture comprises from about 0.05 percent to about 6.5 percent by weight of the free radical polymerization initiator based on a total weight of the non-gaseous monomer and the gaseous monomer. A range of about 0.05 percent to about 6 percent by weight of the free radical polymerization initiator may be preferred since it provides an acceptable rate of polymerization and leads to the synthesis of copolymers with molecular properties which enable toners containing these copolymers to melt at low temperatures. Too high a concentration of initiators may result in an undesirable low molecular weight polymer. Reaction time can be excessive when the concentration of initiator is less than about 0.05 percent. Moreover, the suspension may become unstable because of long contact times at low conversions. Polymers exhibiting an undesirable high molecular weight can be obtained when the initiator concentration is low.

Suspension stabilizing agents are generally utilized in the process of the present invention. These known suspension stabilizing agents include a finely divided, largely water insoluble powder, such as tricalcium phosphate (TCP), barium phosphate, zinc phosphate magnesium phosphate, bentonite, talc and the like, as well as organic suspension stabilizers such as polyvinylalcohol, cellulosic derivatives and the like. The amount of known suspension stabilizing agent that may be used in prior art processes can be from about 0.05 percent to about 5.0 percent by weight, based on total weight of the liquid or solid monomer and gaseous monomer. The amount of suspension stabilizing agent of from about 0.05 percent to about 5.0 percent is preferred since it usually assures a stable suspension of copolymer particles.

An ionic surfactant may also be optionally utilized to disperse the suspension stabilizing agent and to modify and control the interfacial surface tension of the system. Such ionic surfactants participate in establishing the droplet (bead) size of the organic phase and aid the suspension stabilizing agents to more effectively stabilize the suspension and include sodium oleate, oodecylbenzene sodium sulphonate, sodium tetradecyl sulphate, and sodium alkyl naphthalene sulfonate (Alkanol® XC, available from E.I. duPont de Nemours & Company). The ionic surfactant may be present in an amount between about 0.2 percent and about 4 percent by weight based on the total weight of the suspension stabilizing agent.

The amount of water employed in the suspension polymerization process of this invention may be varied, but for reasons of heat transfer and monomer and polymer handling, a water to combined liquid or solid monomer and gaseous monomer weight proportion is preferably between about 0.8:1 and about 2:1. When the amount of water is less than about 0.8:1, it may become difficult to avoid agglomeration of the suspended copolymer particles under reaction conditions. When more than a 2:1 ratio is utilized, the low output of copolymer from a given reactor tends to become commercially unattractive.

The reaction should be conducted in an inert atmosphere such as nitrogen, argon and the like. Moreover, the polymerization reaction should be accomplished in a closed system to avoid loss of the gaseous monomer and preferably at a pressure of between about 20 psi and about 140 psi, and more preferably between about 40 psi and about 100 psi to drive the gaseous monomers into the organic phase of the aqueous suspension where the polymerization occurs. The pressurized polymerization system can comprise a vapor phase containing the gaseous monomer and an inert gas and an aqueous phase containing water, the liquid or solid monomer, the solubilized portion of the gaseous monomer, the suspension stabilizing agent, the surfactant, and one or more free radical polymerization initiators, as well as other additives.

Stirring of the reaction mixture during heating is highly desirable to, for example, avoid agglomeration of the suspended copolymer particles and to disperse the heat of reaction. Any suitable known conventional techniques may be utilized. Typical agitation systems include mechanical stirring devices, magnetic mixers, ultrasonic agitators, and the like.

A batch or continuous process may be employed, with the batch process being preferred.

In the process of the present invention in embodiments, there are provided a vapor phase comprised of the gaseous monomer and an optional inert gas such as nitrogen, argon, and the like, and an aqueous suspension comprised of an aqueous phase and an organic phase comprising the solid or liquid monomer. A portion of the gaseous monomer is solubilized in the aqueous phase and the organic phase. At the outset of the polymerization process, the gaseous monomer in the aqueous suspension and the vapor phase is in an amount of from 0% to 100% by weight, preferably from about 10% to about 90% by weight, most preferred from about 20% to about 80% by weight of the total weight of the gaseous monomer employed in the polymerization process. The phrase "at the outset of the polymerization process" denotes when homopolymerization or copolymerization of one or more of the various monomers is just starting.

In suspension polymerization systems, polymerization of the monomers occurs in the organic phase. Also, the organic phase is generally in the form of small droplets having an average diameter of from about 0.1 to about 1 mm, suspended in the aqueous solution. An advantage of suspension polymerization is that the polymeric products are obtained in the form of these small beads or particles, which are easily filtered, washed, and dried.

The amount of the gaseous monomer in the vapor phase and the aqueous suspension during the polymerization process may be controlled by any suitable technique such as by the addition of gaseous monomer to the vapor phase, or the removal of gaseous monomer from the vapor phase, or a combination thereof.

Gaseous monomer may be added to the vapor phase by any suitable method after polymerization of about 5% to about 90% by weight, preferably about 30% to about 80% by weight, most preferably about 40% to about 60% by weight, of the liquid or solid monomer, whereby part of the gaseous monomer dissolves in the aqueous phase and diffuses to the organic phase where it is consumed in the polymerization. The amount of the added gaseous monomer may be any amount, up to 100% by weight of the total weight of the gaseous monomer employed in the polymerization process. It is preferred that the gaseous monomer is added in an effective amount sufficient to render the resulting polymeric material nonhomogeneous. This added effective amount preferably is from about 10% to 100% by weight, more preferably from about 20% to about 90% by weight, and most preferably from about 30% to about 70% by weight of the total weight of the gaseous monomer employed in the polymerization process. The amount of added gaseous monomer depends on the amount of gaseous monomer present at the outset of the process and the sum of the two amounts should equal 100% of the total weight of the gaseous monomer employed in the polymerization process. Addition of the gaseous monomer may be made at one time, in several stages, or continuously during the polymerization process.

In one embodiment, no gaseous monomer is present in the vapor phase and the aqueous suspension with the liquid or solid monomer at the outset of the polymerization process. However, after homopolymerization of about 5% to about 90% by weight of the liquid or solid monomer, gaseous monomer is added to the vapor phase, which dissolves in the water and diffuses to the organic phase beads or particles, where the gaseous monomer copolymerizes with the liquid or solid monomer, resulting in polymeric material comprised of an intimate composite of homopolymer of the liquid or solid monomer and a random copolymer. The polymeric material may also contain polymer chains having a homopolymer block segment and a random copolymer block segment. Thus, the polymeric material may be a composite of homopolymers and copolymers.

In another embodiment, a portion of the gaseous monomer in any amount, preferably about 20% to about 80% by weight of the total amount of the gaseous monomer employed in the polymerization process is present in the aqueous suspension and the vapor phase at the outset of the polymerization. After the copolymerization has been initiated and a conversion of about 5% to about 80% by weight of the liquid or solid monomer has been achieved, additional gaseous monomer is added to the vapor phase. The additional gaseous monomer dissolves in the water and diffuses to the organic phase where the gaseous monomer copolymerizes with the liquid or solid monomer, resulting in polymeric material comprised of a copolymer composite with copolymers of varying gaseous monomer content.

In another embodiment, the unreacted gaseous monomer present in the vapor phase and the aqueous suspension during the polymerization process, may be removed before copolymerization of about 70% by weight, preferably about 60% by weight, and most preferred, about 50% by weight of the gaseous monomer in the aqueous suspension. Unreacted gaseous monomer is preferably removed from the vapor phase in an amount sufficient to render the resulting polymeric material nonhomogeneous. The amount removed preferably is from about 5% to nearly 100% by weight, more preferably from about 20% to about 90% by weight, and most preferably from about 30% to about 70% by weight of the total weight of the gaseous monomer in the vapor phase. In one embodiment, substantially all unreacted gaseous monomer can be removed from the vapor phase. Removal of substantially all of the gaseous monomer in the vapor phase means reduction of the gaseous monomer concentration in the vapor phase to a concentration less than about 1% by volume, preferably less than about 0.5% by volume, and most preferably less than about 0.05% by volume. The removal may be accomplished at one time, in several stages, or continuously, but the removal is completed in any case by the designated polymerization point, i.e., before copolymerization of about 70% by weight, preferably, about 60% by weight, and most preferred, about 50% by weight of the gaseous monomer in the aqueous suspension. After the removal of gaseous monomer, the polymerization is continued with the formation of beads or particles of polymeric composites containing mixtures of copolymers and homopolymers and/or mixtures of copolymers of varying gaseous monomer content. The polymeric material may also contain polymer chains having a homopolymer block segment and/or random copolymer block segments.

Removal of the gaseous monomer from the vapor phase may be effected by any suitable technique. For example, the gaseous monomer may be removed by venting and depressurization of the reactor, venting and continuous purging the reactor with an inert gas, recycling the reactor vapor space through an appropriate gaseous monomer scrubber, and the like. When venting and depressurization is employed, the venting step may be repeated at least twice to ensure adequate removal of monomer vapor. A venting and depressurization procedure involves the following steps. A valve is opened and the pressure in the vapor phase of the reactor is released at a rate convenient for the reactor repressurized with an inert gas. This pressure resulting from repressurization is then released and the aforementioned process may then be repeated. A removal of the gaseous monomer by venting and continuous purging with an inert gas replaces the above described depressurization/repressurization cycles with a continuous inert gas purge of the vapor phase accomplishing the same results without additional process time associated with the depressurization/repressurization cycles and avoids undesired foam formation. It is understood that this removal process may occur only when there is some gaseous monomer present in the vapor phase. Thus, in those embodiments where no gaseous monomer is present at the outset of polymerization and the gaseous monomer is added at a later point after the start of polymerization, the removal step, if employed, must occur after the addition of the gaseous monomer to the vapor phase.

In one embodiment, there is provided in the aqueous suspension and the vapor phase 100% by weight of the total weight of the gaseous monomer employed in the polymerization process at the outset of the process. Before copolymerization of about 70% by weight of the gaseous monomer, substantially all of the gaseous monomer in the vapor phase is removed, resulting in beads or particles of a polymeric material comprised of a mixture of copolymer and homopolymer and of polymer chains having a random copolymer block segment and a homopolymer block segment.

It is also contemplated that both the steps of the addition and removal of the gaseous monomer may be performed in the polymerization process in any sequence.

In the various steps of the instant process, monitoring of the polymerization of the various monomers may be accomplished by any suitable technique. In suspension polymerization systems, the gaseous monomer is partitioned between the organic phase, aqueous phase and the vapor phase. It is believed that a dynamic pressure equilibrium controls the partition. As the gaseous monomer in the organic phase copolymerizes with the liquid or solid monomer, fresh quantities of the gaseous monomer from the vapor phase and aqueous phase enter the beads of the organic phase. The pressure in the suspension polymerization system decreases as the gaseous monomer is consumed in the polymerization. The conversion of the gaseous monomer may be indirectly monitored by continuous or periodic recording of the decrease in pressure in the suspension polymerization system. Samples may also be taken of the aqueous suspension during the polymerization process and analyzed by gas chromatography and gel permeation chromatography to monitor the polymerization of the liquid or solid monomer.

Suitable time-temperature polymerization profiles for the multistage heating profile embodiment of this invention may be determined by considering the half life characteristics of the initiators and the length of time devoted moving from one temperature to another (the ramp).

The polymerization temperature will be dependent to some extent upon the half life of the free radical polymerization initiator and the weight ratio of initiator to monomer utilized. Generally, a temperature between about 50° C. and about 130° C. is satisfactory.

The multistage heating profile has been found to be capable of reducing the residual styrene monomer and the residual butadiene monomer content in the final copolymer product. Residual monomer content in the final copolymer product can be minimized to avoid a reduction of the block temperature and perhaps undesirable environmental effects produced when the resin is subjected to fusing conditions in some electrostatographic copier and duplicators. Generally, for multistage heating profiles, it is desirable that between about 70 percent and about 95 percent by weight of the total monomer mixture be polymerized in the first heating stage to about the molecular weight desired and thereafter heated to one or more subsequent stages to polymerize the residual monomer remaining in the composition. It is further believed that a second initiator, active mostly at higher temperatures, such as O,O-t-amyl-O-(2-ethylhexyl) monoperoxycarbonate or O,O-t-butyl-O-(2-ethylhexyl) monoperoxycarbonate used concurrently with the multistage heating profile is preferred in order to complete the polymerization to very low residual monomers.

Significant reduction of the residual monomers in the final reaction product may be achieved (as low as about 0.05% by weight of the residual non-gaseous monomer and as low as about 17 ppm by weight of the residual gaseous monomer, both based on the total weight of the final reaction product) by heating the aqueous mixture in accordance with a predetermined heating profile involving heating the aqueous mixture to a first temperature between about 50° C. and less than about 100° C., maintaining the first temperature until substantial thermolitic dissociation of at least one free radical polymerization initiator occurs and thereafter raising the temperature of the aqueous reaction mixture to at least a second temperature greater than about 90° C. and less than about 130° C., and maintaining the second temperature for a sufficient period of time to achieve substantial thermolitic dissociation of a second free radical polymerization initiator. Substantial thermolitic dissociation refers to, for example, that at least about 50 percent based on the initial charge of the free radical polymerization initiator actually dissociates.

A copolymer prepared according to the present invention having a weight average molecular weight between about 10,000 and about 400,000 can be selected for ideal toner resin properties in high speed electrostatographic copies and duplicators. Preferably, the copolymer is a styrene/butadiene copolymer. Also, the materials prepared by the instant invention generally may be homopolymer-copolymer mixtures, copolymer-copolymer mixtures, and could also contain pseudo-block copolymers.

In one embodiment, there is provided a process which results in a bimodal and/or a partially crosslinked polymeric material. The term "bimodal" denotes the presence in a Gel Permeation Chromatography (GPC) trace of two distinct molecular weight components (peaks). Although the peaks depend upon the specific monomers used, the first peak generally is at a molecular weight from about 5,000 to about 50,000 and the second peak generally is at a molecular weight from about 200,000 to about 2 million. It is believed that the second peak (the higher molecular weight component) in the GPC trace of the bimodal material indicates the presence of coupled macromolecular chains or a very slightly crosslinked copolymer component. Although the bimodal material may contain a partially crosslinked component, the crosslinking is not extensive. This is reflected in the solubility of the bimodal material in the same solvents as the standard, monomodal copolymers. In contrast, more highly crosslinked materials are relatively insoluble, containing an insoluble gel. As used herein, the term "crosslinked" generally refers to the more extensively crosslinked copolymer material which is relatively insoluble (gel content over 1%). The polymeric material of the present invention may be bimodal, "crosslinked" and both bimodal and "crosslinked" since a gel may form in addition to the bimodal material. A suitable time-temperature polymerization profile with a multistage heating profile and the use of at least two initiators with different half life characteristics are important for this embodiment of the invention. In this embodiment, the gaseous monomer is a monomer having two double bonds such as butadiene. The liquid or solid monomer is preferably styrene but can be other suitable monomers. Butadiene in an amount from about 10% to about 90% by weight of the total weight of the butadiene employed in the process is present in the vapor phase and the aqueous suspension at the outset of the polymerization process. Additional butadiene is added to the vapor phase after polymerization of about 20% to about 90% by weight, preferably about 30% to about 80% by weight, of the styrene, whereby part of the additional butadiene dissolves in the aqueous suspension and diffuses to the organic phase where it takes part in the copolymerization. It is preferred that butadiene is added in an effective amount sufficient to render the resulting polymeric material nonhomogeneous. This added effective amount preferably is from about 10% to about 90% by weight, more preferably from about 20% to about 90% by weight, and most preferably from about 30% to about 70% by weight of the total weight of the butadiene employed in the polymerization process. At a suitable conversion of the monomers, the aqueous suspension is heated to a higher polymerization temperature, such as from about 100° C. to about 130° C., preferably from about 105° C. to about 125° C., depending on the initiators used, to result in a bimodal and/or partially crosslinked polymeric material. The unreacted butadiene functions as the crosslinker by a free radical polymerization. It is believed that the extent of crosslinking, that is the formation of only bimodal, or bimodal and "crosslinked", or partially crosslinked material is controlled by the amount of the additional butadiene added during the polymerization process, the amount of butadiene present before heating to the higher polymerization temperature, the initiators used and the temperature of the higher temperature polymerization step.

Although the process specifics of the present invention have been illustrated primarily with respect to styrene/butadiene copolymers, similar or equivalent parameters and specifics can, it is believed, be utilized for the preparation of other known toner polymer products, such as styrene/acrylonitrile copolymers, styrene based terpolymers, and the like.

The invention will now be described in detail with respect to specific preferred embodiments thereof, it being understood that these examples are intended to be illustrative only and the invention is not intended to be limited to the materials, conditions or process parameters recited herein. All percentages and parts are by weight unless otherwise indicated. In the following examples, $M_w$ indicates weight average molecular weight, $M_n$ indicates number average molecular weight, DSC indicates Differential Scanning Calorimetry, SCFH indicates standard cubic feet per hour, GPC indicates Gel Permeation Chromatography, TCP indicates tricalcium phosphate, BPO indicates benzoyl peroxide, and TBEC indicates OO-t-butyl-O-(2-ethylhexyl)monoperoxycarbonate. Comparative examples are also provided.

COMPARATIVE EXAMPLE 1

Styrene/Butadiene Suspension Polymerization

A styrene/butadiene suspension copolymerization was performed in a 600 ml PARR pressure reactor. The aqueous phase was prepared by forming a dispersion of 4.0 g (grams) tricalcium phosphate (TCP) and 0.064 g Alkanol® XC (sodium alkylnaphthalenesulfonate) in 246 g of deionized water at an agitator speed of 400 RPM. The aqueous phase was heated to 95° C. in the closed reactor and a mixture of monomers and initiators containing 99.0 g styrene, 14.5 g butadiene, 4.04 g benzoyl peroxide (BPO −78%) and 0.52 g OO-t-butyl-O-(2-ethylhexyl)monoperoxycarbonate (TBEC) was injected from a 300 ml cylinder using nitrogen pressure. Thus, the styrene/butadiene ratio in the feed is 87.23/12.77 by weight percent. The polymerization was carried out at 95° C. for 5 hours at which point a continuous nitrogen purge was applied to remove any unreacted butadiene. The continuous nitrogen purge was applied until the end of polymerization. At the same time the reactor contents were heated to 125° C. and the polymerization continued for 1 hour at this temperature before cooling was applied. The copolymer was filtered, washed and dried under vacuum.

The resulting copolymer composite had a butadiene content of about 13.0% and a styrene content of about 87% (as determined by IR method), a Tg of 59.0° C. (by DSC), Mw of 121,700 and $M_n$ of 16,300 (by GPC).

EXAMPLE 2

Styrene/Butadiene Suspension Polymerization Using Delayed Butadiene Addition A styrene/butadiene copolymer composite was prepared using the polymerization system described in Example 1. After the preparation of the aqueous phase and heating to 95° C., the monomer initiator mixture containing only styrene (99.0g), and the two initiators (BPO and TBEC) were introduced into the reactor and the polymerization reaction was initiated. Immediately after the introduction of the styrene-initiators mixture (about 5 minutes from start), 14.5 g butadiene was injected in the reactor from a separate cylinder using nitrogen pressure. The polymerization was then completed as described in Example 1.

The resulting beads or particles of polymeric material are believed to contain a composite formed of styrene homopolymers, styrene butadiene copolymer and some pseudo-block copolymers having a styrene homopolymeric segment and a random copolymer segment. The resulting polymer composite has a butadiene content of 13.2% and a styrene content of 86.8% (by IR), a Tg of 58.0° C., $M_w$ of 121,300 and $M_n$ of 15,700. A comparison of the polymer product GPC trace of Example 2 with that of Example 1 reveals that the polymeric material of Example 2 has a more pronounced bimodal molecular weight distribution, higher low molecular weight component (GPC for Example 2 shows a maximum peak at about 10,000; GPC for Example 1 shows a maximum peak at about 50,000) and a higher content of very high molecular weight component.

EXAMPLE 3

Styrene/Butadiene Suspension Polymerization Using Venting Of Butadiene At Low Conversion A styrene/butadiene copolymer composite was prepared using a high butadiene loading to start the copolymerization followed by a venting of the butadiene after half an hour of reaction. After the aqueous phase was prepared and heated to 95° C. as described in Example 1, a monomer initiator mixture, containing 99.0 g styrene, 29.0 g butadiene and the two initiators as specified in Example 1, was introduced into the reactor and the copolymerization initiated. After half an hour at 95° C., the reactor vent was opened and a nitrogen purge applied while maintaining the pressure in the reactor at 100 kPa. The copolymerization was continued for a total of 5 hours at 95° C. with the nitrogen purge on, followed by an increase of the temperature to 125° C. and completion of polymerization and recovery of copolymer as described in Example 1.

It is believed that the resulting beads or particles of polymeric material may contain a composite of random copolymers, styrene homopolymer, and some pseudo-block copolymers having a styrene homopolymer block segment and a random copolymer segment. The polymer composite obtained has a butadiene content of 10.1% and a styrene content of 89.9% (by IR), a Tg of 64.9° C., $M_w$ of 58,300 and $M_n$ of 16,400. A comparison of the GPC trace of Example 3 with that of Example 1 reveals that the polymeric material of Example 3 shows a significantly narrower molecular weight distribution, a very low high $M_w$ component although the MW (molecular weight) peak maximum is about the same as that of the material prepared in Example 1.

COMPARATIVE EXAMPLE 4

Styrene/Butadiene Suspension Polymerization to Form a Copolymer with a Higher Content of Butadiene The styrene/butadiene suspension polymerization was carried out in a 5 gallon stainless steel reactor. The aqueous phase consisting of deionized water, TCP and Alkanol, was charged in the reactor, the agitator started and heat applied to bring the reactor contents to a temperature of 95° C. The mixture of monomers (styrene and butadiene) and initiators (BPO and TBEC) was then introduced into the reactor and the polymerization initiated. The polymerization was carried out using the following time/temperature profile: 137 minutes at 95° C., 40 minutes ramp up to 125° C., 30 minutes nitrogen purge during heating to 125° C. at 5–10 SCFH in order to remove residual butadiene, 60 minutes at 125° C., 90 minutes cool-down to 30° C. At the time of 137 minutes, coincident with the heating of the reactor to 125° C., the 30 minutes nitrogen purge was performed while maintaining the reactor pressure constant by opening a vent valve as much as required to maintain a constant reactor pressure. The batch charge was as follows: styrene 3968.0 g; butadiene 784.0 g; BPO(78%) 213.2 g; TBEC 21.6 g; water 7,700.0 g; TCP 81.6 g; and Alkanol ® XC 2.8 g.

The butadiene/styrene ratio was 16.5:83.5 by weight. The BPO/monomer was 3.5% by weight and the TCP/monomer was 1.7% by weight. The washing procedure involved using 204 g nitric acid in 200 ml water to dissolve the TCP and then the copolymer was washed with deionized water until the acid was removed. The copolymer was dried in a fluidized bed dryer. The characteristics of the copolymer were as follows: $M_w$ 126,100 by GPC; $M_n$ 18,700 by GPC; Tg 47.4° C.; gel content less than 1%.

EXAMPLE 5

Styrene/Butadiene Suspension Polymerization To Form a Bimodal Copolymer

The experiment was run using the same butadiene-styrene ratio as in Example 4 (16.5% by weight butadiene), but only a portion of the butadiene (first charge) was introduced together with the styrene and the initiators. The second portion of butadiene was introduced after one hour of polymerization over a 10 minute period at the polymerization temperature of 95° C., while maintaining the reactor pressure under 100 psig. The polymerization was continued at 95° C. and then completed according to the following procedure and time/temperature profile: 138 minutes total time at 95° C., 27 minutes ramp up to 115° C., 90 minutes at 115° C., nitrogen purge started during heating to 125° C. at 5-10 SCFH in order to remove residual butadiene, 30 minutes ramp from 115° C. to 125° C. and 30 minutes at 125° C. with nitrogen purge, 60 minutes cool-down to 30° C. The batch charge was as follows: styrene 3968.0 g; butadiene (first charge) 606 g; BPO(78%) 243.7 g; TBEC 21.6 g; water 7,700 g; TCP 81.6 g; Alkanol ® XC 2.8 g; and butadiene (second charge) 178 g.

The total butadiene/styrene ratio was 16.5:83.5 by weight. The initial butadiene/styrene ratio was 13.25:86.75 by weight. The BPO/monomer was 4.0% by weight and the TCP/monomer was 1.7% by weight. The washing procedure involved using 204 g nitric acid in 200 ml water to solubilize the TCP and then the copolymer was washed with deionized water until the acid was removed. The copolymer was dried in a fluidized bed dryer. The characteristics of the copolymer were as follows: $M_w$ 158,400 by GPC; $M_n$ 14,900 by GPC; bimodal distribution of the GPC trace with one peak maximum of the molecular weight at about 20,000 and the second, smaller peak maximum at about 1,000,000; Tg 50.7° C.; gel content less than 1%.

EXAMPLE 6

Styrene/Butadiene Suspension Polymerization To Form a Crosslinked And Bimodal Copolymer The experiment was run using the same butadiene/styrene ratio as in Examples 4 and 5 (16.5% butadiene by weight). As in Example 5, only a portion of the butadiene (first charge) was introduced together with the styrene and the initiators. The second portion of butadiene was introduced after 60-minutes of polymerization at 95° C. had elapsed. The second charge of butadiene was introduced at 95° C., in about 20 minutes while maintaining the reactor pressure under 100 psig. The polymerization was continued at 95° C. and then completed according to the following procedure and time/temperature profile: 165 minutes total time at 95° C., 27 minutes ramp up to 115° C., 90 minutes at 115° C., nitrogen purge started at the end of the 115° C. polymerization, at 5-10 SCFH in order to remove residual butadiene, 60 minutes cool-down to 30° C. The batch charge was as follows: styrene 3968.0 g; butadiene (first charge) 475.0 g; BPO(78%) 243.7 g; TBEC 21.6 g; water 7,700.0 g; TCP 81.6 g; Alkanol ® XC 2.8 g; and butadiene (second charge) 309.0 g. The characteristics of the copolymer were as follows: $M_w$ 114,700 by GPC; $M_n$ 14,600 by GPC for the soluble component of the copolymer; bimodal distribution of the GPC trace with one peak maximum of the molecular weight at about 20,000 and the second, smaller peak maximum at about 1,200,000; Tg 51.6° C.; gel content 6.7%.

EXAMPLE 7

Styrene/Butadiene Suspension Polymerization To Form a Partially Crosslinked Copolymer The experiment was run using the same butadiene/styrene ratio as in Examples 4, 5 and 6 (16.5% butadiene by weight). As in Example 5 and 6, only a portion of the butadiene (first charge) was introduced together with the styrene and the initiators. The second portion of butadiene was introduced after 60 minutes of polymerization at 95° C. had elapsed. The second charge of butadiene was introduced at 95° C., in about 15 minutes while maintaining the reactor pressure under 100 psig. The polymerization was continued at 95° C. and then completed according to the following procedure and time/temperature profile: 138 minutes total time at 95° C., 30 minutes ramp up to 110° C., 90 minutes at 110° C., nitrogen purge started during heating to 125° C. at 5-10 SCFH in order to remove residual butadiene, 30 minutes ramp from 110° C. to 125° C., 30 minutes at 125° C. with nitrogen purge, 60 minutes cool-down to 30° C. The batch charge was as follows: styrene 3968.0 g; butadiene (first charge) 475.0 g; BPO (78%) 170.6 g; TBEC 21.6 g; water 7,700.0 g; TCP 81.6 g; Alkanol ®XC 2.8 g; and butadiene (second charge) 309.0 g. The characteristics of the copolymer were as follows: gel content 12.3%, Tg 50.6° C. Note: GPC could not be run due to the difficulties in filtering the high gel content (crosslinked) polymer.

In Examples 4, 5, 6, and 7, the rheological properties of the polymeric materials were also analyzed as a function of temperature and frequency using a Rheometric Mechanical Spectrometer RMS-800 available from Rheometrics, Inc. A frequency/temperature sweep was performed in the dynamic mode using 25 mm parallel plates, in the frequency range of 0.1 to 100 radians/second and a temperature range from about 80° C. to about 180° C. Dynamic viscosity n' (poise) and elastic modulus G' (dynes/cm$^2$) were plotted against temperature at a particular frequency.

Regarding Examples 4, 5, 6 and 7, it is clear that the molecular weight distribution can be altered significantly by the procedures of Examples 5, 6 and 7 as compared with Example 4. A distinct high molecular weight peak is observed (e.g. Example 5), or a bimodal and partially crosslinked component can be formed (6.7% gel in Example 6), or furthermore a highly crosslinked copolymer can be formed (12.3% gel in Example 7). The high molecular weight component and/or the partially crosslinked component (gel) has a significant impact on the rheological properties of the polymeric material by, for example, increasing its elasticity at high temperatures, i.e., exceeding about 125° C. This enhanced elasticity can be expected to increase the hot offset temperature of a toner incorporating the polymeric material produced by the present invention. As is generally known, the hot offset temperature (HOT) is the maximum temperature at which the toner does not adhere to the fuser roll. When the fuser temperature exceeds the hot offset temperature, some of the molten toner adheres to the fuser roll during fixing and is transferred to subsequent substrates containing developed images, resulting for example in blurred images. This undesirable phenomenon is called offsetting. The minimum fix temperature (MFT) is the minimum temperature at which acceptable adhesion of the toner to the support medium occurs, that is, as determined by for example a creasing test. The difference between MFT and HOT is called the Fusing Latitude. Due to the enhanced elasticity of the polymeric material produced by some of the embodiments of the present invention, it is expected that toners incorporating some of these polymeric materials will have an increased Fusing Latitude.

It is expected that by varying the butadiene content of the copolymer in order to adjust the Tg, the amount of initiator in order to adjust the molecular weight, other polymerization parameters, such as time/temperature profile, butadiene venting and the like, the molecular properties of the copolymers obtained by the present invention can be adjusted with a large latitude.

Other modifications of the present invention may occur to those skilled in the art based upon a reading of the present disclosure and these modifications are intended to be included within the scope of the present invention.

We claim:

1. A suspension polymerization process for the preparation of a polymeric material formed from at least two monomers, a first monomer and a gaseous second monomer, comprising:
   (a) providing a vapor phase and an aqueous suspension comprised of an aqueous phase and an organic phase comprising the first monomer, wherein the gaseous monomer is partitioned among the vapor phase, the organic phase, and the aqueous phase, and wherein the gaseous monomer in the vapor phase and the aqueous suspension at the outset of polymerization is in an amount of from 0% to 100% by weight of the total weight of the gaseous monomer employed in the polymerization process;
   (b) controlling the amount of the gaseous monomer in the aqueous suspension and the vapor phase during the polymerization process by:
   (i) adding gaseous monomer to the vapor phase after polymerization of about 5% to about 90% by weight of the first monomer, whereby during the remainder of the polymerization process the gaseous monomer solubilizes in the aqueous suspension and diffuses to the organic phase where it copolymerizes with the first monomer; or
   (ii) removing in an effective amount sufficient to render the resulting polymeric material nonhomogeneous at least a portion of the gaseous monomer in the vapor phase before polymerization of about 70% by weight of the gaseous monomer in the aqueous suspension and continuing the polymerization process; or
   (iii) a combination of steps (i) and (ii); and
   (c) heating the aqueous suspension to a temperature between about 50° C. and about 130° C.

2. The process according to claim 1, wherein the gaseous monomer is butadiene.

3. The process according to claim 1, wherein the first monomer is styrene.

4. The process according to claim 1, wherein the step (a) provides in the vapor phase and the aqueous suspension at the outset of the polymerization process about 10% to about 90% by weight of the total weight of the gaseous monomer employed in the polymerization process.

5. The process according to claim 1, wherein the step (b) adds the gaseous monomer to the vapor phase after polymerization of about 30% to about 80% by weight of the first monomer.

6. The process according to claim 1, wherein the step (b) adds the gaseous monomer to the vapor phase after polymerization of about 40% to about 60% by weight of the first monomer.

7. The process according to claim 1, wherein the step (b) removes the portion of the gaseous monomer in the vapor phase before polymerization of about 60% by weight of the gaseous monomer in the aqueous suspension.

8. The process according to claim 1, wherein the step (b) removes substantially all of the gaseous monomer in the vapor phase before polymerization of about 60% by weight of the gaseous monomer in the aqueous suspension.

9. The process according to claim 1, wherein the step (b) adds or removes the gaseous monomer continuously or in several stages.

10. The process according to claim 1, wherein the step (b) adds or removes the gaseous monomer at one time.

11. The process according to claim 1, wherein the step (a) provides in the aqueous suspension and the vapor phase at the outset of the polymerization process 0% by weight of the total weight of the gaseous monomer employed in the polymerization process and the step (b) adds gaseous monomer to the vapor phase after polymerization of about 5% to about 90% by weight of the first monomer, resulting in beads or particles of the polymeric material comprised of a composite of a homopolymer, a random copolymer, and polymer chains having a homopolymer block segment and a random copolymer block segment.

12. The process according to claim 1, wherein the step (a) provides in the aqueous suspension and the vapor phase at the outset of the polymerization process 100% by weight of the total weight of the gaseous monomer employed in the polymerization process and the step (b) removes the portion of the gaseous monomer in the vapor phase before polymerization of about 70% by weight of the gaseous monomer in the aqueous suspension, resulting in beads or particles of the polymeric material comprised of a composite of a random copolymer, a homopolymer, and polymer chains having a random copolymer block segment and a homopolymer block segment.

13. The process according to claim 1, wherein the step (a) provides in the aqueous suspension and the vapor phase at the outset of the polymerization process a portion of the total amount of the gaseous monomer employed in the polymerization process and the step (b) adds additional gaseous monomer as claimed in claim 1, resulting in the polymeric material comprised of a composite of copolymers of varying gaseous monomer content.

14. The process according to claim 1, wherein the step (b) (iii) employs the step (b) (i) and (b) (ii) in any sequence.

15. The process according to claim 1, wherein the polymeric material is formed from only two monomers, the first monomer and the gaseous monomer.

16. The process according to claim 1, wherein in the step (b), the gaseous monomer is added in an effective amount sufficient to render the resulting polymeric material nonhomogeneous.

17. The process according to claim 1, wherein the polymeric material is a random copolymer.

18. A suspension polymerization process for the preparation of a polymeric material formed from at least two monomers, a first monomer and a gaseous monomer having at least two double bonds, comprising:
  (a) providing a vapor phase and an aqueous suspension comprised of an aqueous phase and an organic phase comprising the first monomer, wherein the gaseous monomer is partitioned among the vapor phase, the organic phase, and the aqueous phase, and wherein the gaseous monomer in the vapor phase and the aqueous suspension at the outset of the polymerization process is in an amount of from about 10% to about 90% by weight of the total weight of the gaseous monomer employed in the polymerization process;
  (b) adding additional gaseous monomer to the vapor phase after polymerization of about 20% to about 90% by weight of the first monomer, whereby during the remainder of the polymerization process the gaseous monomer solubilizes in the aqueous suspension and diffuses to the organic phase where it polymerizes with the first monomer; and
  (c) heating the aqueous suspension to a temperature from about 50° C. to about 130° C. to result in the polymeric material.

19. The process according to claim 18, wherein the step (b) adds additional gaseous monomer to the vapor phase after polymerization of about 30% to about 80% by weight of the first monomer.

20. The process according to claim 18, wherein the step (c) involves a multistage heating profile with the polymerization performed at least at two different temperatures.

21. The process according to claim 20, wherein there are selected at least two free radical polymerization initiators, with different half life characteristics.

22. The process according to claim 18, wherein the first monomer is styrene.

23. The process according to claim 18, wherein the step (a) provides the gaseous monomer at the outset of the polymerization process in an amount of from about 20% to about 80% by weight of the total weight of the gaseous monomer employed in the polymerization process.

24. The process according to claim 18, wherein the gaseous monomer is selected from the group consisting of butadiene and isoprene.

25. The process according to claim 18, wherein the polymeric material is bimodal, at least partially crosslinked, or both.

* * * * *